(12) United States Patent
Degner et al.

(10) Patent No.: US 7,054,737 B2
(45) Date of Patent: May 30, 2006

(54) POWER ELECTRONICS CIRCUIT WITH VOLTAGE REGULATOR FOR ELECTROMECHANICAL VALVE ACTUATOR OF AN INTERNAL COMBUSTION ENGINE

(75) Inventors: Michael Degner, Novi, MI (US); John Grabowski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 10/804,667

(22) Filed: Mar. 18, 2004

(65) Prior Publication Data

US 2005/0209768 A1    Sep. 22, 2005

(51) Int. Cl.
F01L 9/04 (2006.01)
F02D 13/06 (2006.01)

(52) U.S. Cl. ............... 701/115; 123/90.11; 123/198 F

(58) Field of Classification Search ................ 701/102, 701/115; 123/90.11, 198 F
See application file for complete search history.

(56) References Cited

U.S. PATENT DOCUMENTS

| 5,804,962 | A | 9/1998 | Kather et al. |
|---|---|---|---|
| 6,121,715 | A * | 9/2000 | Hoffmann et al. ..... 310/316.03 |
| 6,201,681 | B1 | 3/2001 | Torii et al. |
| 6,363,895 | B1 | 4/2002 | Butzmann et al. |
| 6,626,146 | B1 | 9/2003 | Yanai et al. |
| 2002/0104494 | A1 | 8/2002 | Ozawa et al. |

FOREIGN PATENT DOCUMENTS

| DE | 19701471 | 7/1998 |
|---|---|---|
| EP | 1010867 | 12/1999 |

OTHER PUBLICATIONS

U.S. Appl. No. 10/873,713, filed Jun. 21, 2004, Degner et al.
U.S. Appl. No. 10/804,675, filed Mar. 18, 2004, Degner et al.
U.S. Appl. No. 10/873,712, filed Jun. 21, 2004, Degner et al.

* cited by examiner

*Primary Examiner*—Andrew M. Dolinar
(74) *Attorney, Agent, or Firm*—Allan J. Lippa; Alleman Hall McCoy Russell & Tuttle LLP

(57) ABSTRACT

A dual coil half bridge converter adapted to be coupled to a dual coil actuator of a cylinder valve in an internal combustion engine is described. In one example, the converter has a first and second capacitor and a voltage source, where the converter is actuated via switches to individually energizing coils in said dual coil actuator. A voltage regulator is also shown for maintaining midpoint voltage during unequal loading of different actuator coils in the converter.

22 Claims, 7 Drawing Sheets

POWER ELECTRONICS CIRCUIT WITH VOLTAGE REGULATOR FOR ELECTROMECHANICAL VALVE ACTUATOR OF AN INTERNAL COMBUSTION ENGINE

FIELD

The field of the disclosure relates to power electronics for electromechanical actuators coupled to cylinder valves of an internal combustion engine, and more particularly for a dual coil valve actuator.

BACKGROUND AND SUMMARY

In multi-phase electronic converter applications, a number of bridge driver circuits (full or half) can be cascaded together while sharing a common power supply 110. A full bridge converter 100 is shown in FIG. 1 with four actuators (120) cascaded together. In this design, each load element 120 (actuator) is independently controlled by modulating the conduction of the appropriate power devices, in one of the three voltage operating modes (positive voltage, negative voltage, free-wheeling mode) by actuating switches 112 and 118, 114 and 116, 112 and 116 or 114 and 118, respectively.

A half-bridge equivalent configuration can also be used for applications that do not require bi-directional current flow, shown in FIG. 2. One difference between the two is that the half bridge circuit 200 has two of the power switches (114 and 116) replaced with power diodes (122 and 124, respectively). This substitution provides a cost reduction by eliminating the power switches as well as the associated gate drive circuitry and controller complexity.

Either type of converter can be used for controlling actuators and are representative of the majority of power converters that can be used.

However, the inventors herein have recognized a disadvantage when trying to use such converter designs to control electromechanically actuated valves of a cylinder in an internal combustion engine. For example, in the case of a half bridge converter, four power devices (2 switches and 2 diodes) are required for each electromagnet. And, since electrically actuated valves of an engine typically use two actuator coils per cylinder, a typical 32 valve V-8 engine would require 256 devices. This creates a significant added cost for an engine with electromechanically actuated valves, even if not all valves are electrically powered. Further, not only would the above converter approaches require significant numbers of devices, but would also increase wiring and harness costs, since two wires are required per actuator coil.

To overcome the above drawbacks, the inventors herein have developed a power converter that utilizes a split capacitor power supply in various different forms. By using such a converter topology, along with appropriate positioning of flyback diodes and switches, it is possible to require only a single switch to actuate each coil (although more can be used if desired).

However, the above configuration can result in unbalanced capacitor voltages depending on the actuation and loading of the different actuators. This can result in inconsistent actuation of the coils, and when used to control valves of an engine, variations in engine output or air-fuel ratio, for example.

One approach to regulate a voltage of a circuit used for valves of an engine is described in EP 1 010 867. However, the inventors herein have recognized several disadvantages with such an approach. For, the approach of EP '867 utilizes separate actuation and switches to perform the voltage regulation, thereby adding cost to the power converter system.

The above disadvantages can be overcome by a system comprising:
 a circuit for selectively actuating an electromechanical actuator coupled to a valve of an engine, the circuit having at least one energy storage device and at least one switch that selectively energizes said actuator; and
 a computer readable storage medium having a computer program encoded therein for regulating energy stored in said energy storage device, said computer storage medium comprising:
 code for regulating voltage at said energy storage device by adjusting said switch during a first set of engine valve operating conditions.

In this way, it is possible to have a system that enables efficient actuation of the cylinder valves that is capable of operation even under conditions where different cylinder valves experience different loading conditions, such as an intake valve and an exhaust valve, or the opening versus closing of a single valve.

BRIEF DESCRIPTION OF THE DRAWINGS

The advantages described herein will be more fully understood by reading an example of an embodiment, referred to herein as the Description of Example Embodiments, and with reference to the drawings wherein.

DESCRIPTION OF EXAMPLE EMBODIMENTS

Figure 3:
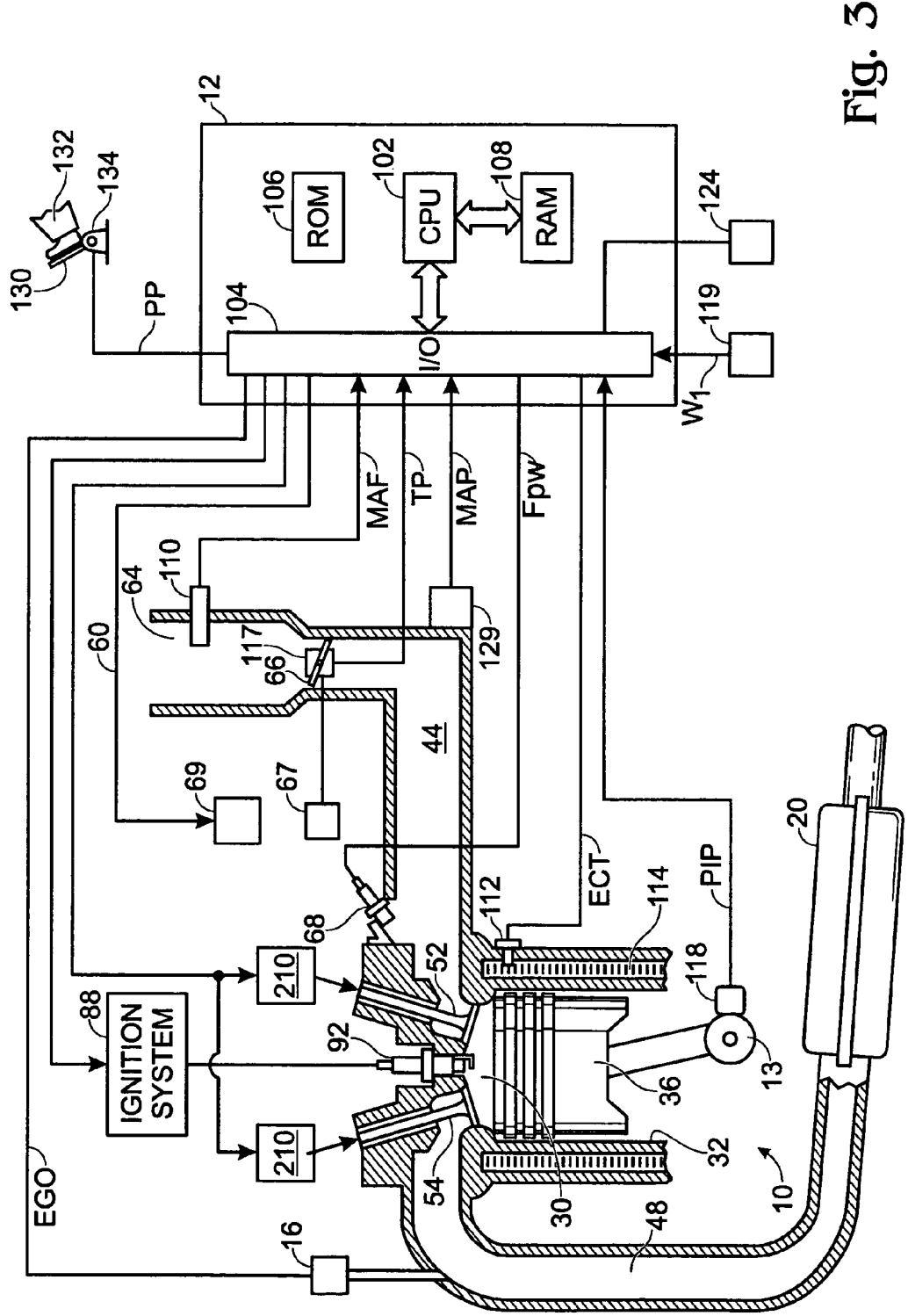
FIG. 3 is a block diagram of a engine illustrating various components.
Figure 4A:
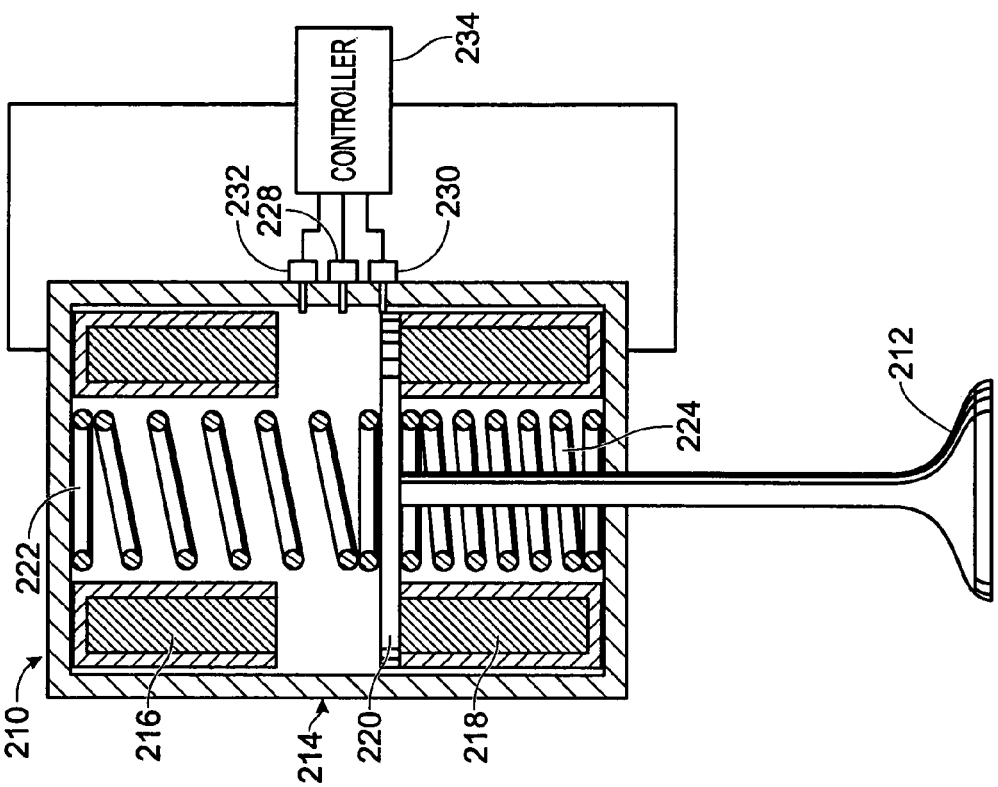
FIG. 4a show a schematic vertical cross-sectional view of an apparatus for controlling valve actuation, with the valve in the fully closed position.
Figure 4B:
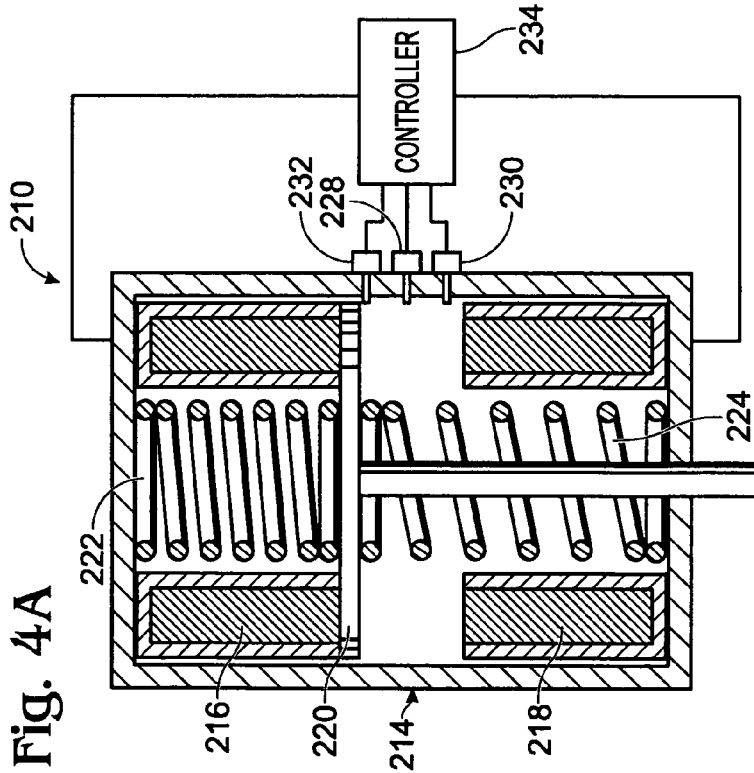
FIG. 4b shows a schematic vertical cross-sectional view of an apparatus for controlling valve actuation as shown in FIG. 3, with the valve in the fully open position.
Figure 5:
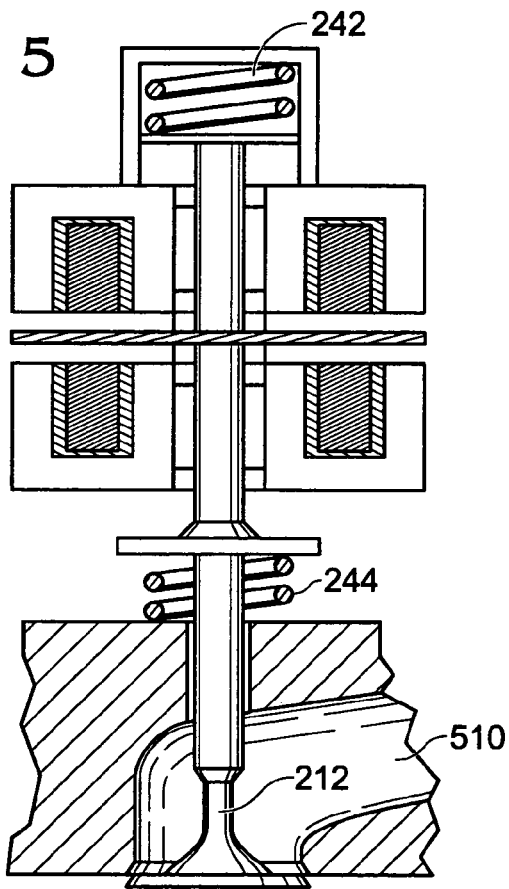
FIG. 5 shows an alternative electronic valve actuator configuration.

This disclosure outlines a new form of converter topology that can provide advantageous operation, especially when used with Electro Magnetic Valve Actuation (EVA) solenoid drivers of an internal combustion engine, as shown by FIGS. 3–5. This improved topology may result in a lower cost and lower component requirements, while maintaining desired functionality.

Referring to FIG. 3, internal combustion engine 10 is shown. Engine 10 is an engine of a passenger vehicle or truck driven on roads by drivers. Engine 10 can coupled to torque converter via crankshaft 13. The torque converter can also coupled to transmission via a turbine shaft. The torque converter has a bypass clutch which can be engaged, disengaged, or partially engaged. When the clutch is either disengaged or partially engaged, the torque converter is said to be in an unlocked state. The turbine shaft is also known as transmission input shaft. The transmission comprises an electronically controlled transmission with a plurality of selectable discrete gear ratios. The transmission also comprises various other gears such as, for example, a final drive ratio. The transmission can also be coupled to tires via an axle. The tires interface the vehicle to the road.

Internal combustion engine 10 comprising a plurality of cylinders, one cylinder of which, shown in FIG. 3, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In one example, converter 20 is a three-way catalyst for converting emissions during operation about stoichiometry. As described more fully below with regard to FIGS. 4a and 4b, at least one of, and potentially both, of valves 52 and 54 are controlled electronically via apparatus 210.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. In an alternative embodiment, no throttle is utilized and airflow is controlled solely using valves 52 and 54. Further, when throttle 66 is included, it can be used to reduce airflow if valves 52 or 54 become degraded, or to create vacuum to draw in recycled exhaust gas (EGR), or fuel vapors from a fuel vapor storage system having a valve controlling the amount of fuel vapors.

Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure from MAP sensor 129, a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Figure 1:
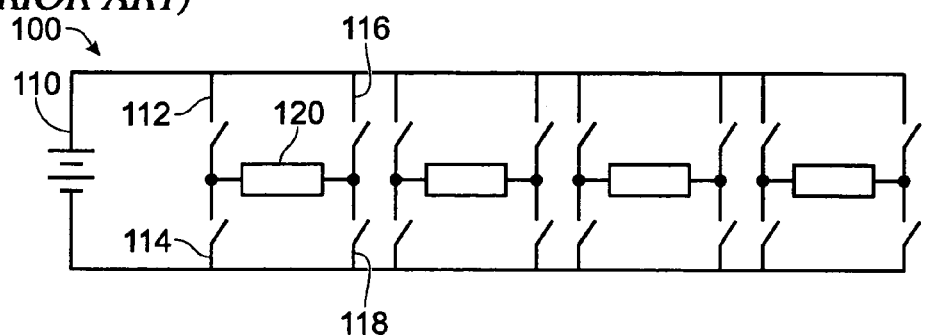
FIG. 1 shows a full-bridge electronic converter.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Also, in yet another alternative embodiment, intake valve 52 can be controlled via actuator 210, and exhaust valve 54 actuated by an overhead cam, or a pushrod activated cam. Further, the exhaust cam can have a hydraulic actuator to vary cam timing, known as variable cam timing.

In still another alternative embodiment, only some of the intake valves are electrically actuated, and other intake valves (and exhaust valves) are cam actuated.

Note that the above approach is not limited to a dual coil actuator, but rather it can be used with other types of actuators. For example, the actuators of FIG. 4 or 6 can be single coil actuators. In any case, the approach synergistically utilizes the high number of actuators (engine valves, in this example) to aid in reducing the number of power devices and the size of the wiring harness. Thus, the dual coil actuator increases this synergy, but a single coil actuator would have similar potential.

Referring to FIGS. 4a and 4b, an apparatus 210 is shown for controlling movement of a valve 212 in camless engine 10 between a fully closed position (shown in FIG. 4a), and a fully open position (shown in FIG. 4b). The apparatus 210 includes an electromagnetic valve actuator (EVA) 214 with upper and lower coils 216, 218 which electromagnetically drive an armature 220 against the force of upper and lower springs 222, 224 for controlling movement of the valve 212.

Switch-type position sensors 228, 230, and 232 are provided and installed so that they switch when the armature 220 crosses the sensor location. It is anticipated that switch-type position sensors can be easily manufactured based on optical technology (e.g., LEDs and photo elements) and when combined with appropriate asynchronous circuitry they would yield a signal with the rising edge when the armature crosses the sensor location. It is furthermore anticipated that these sensors would result in cost reduction as compared to continuous position sensors, and would be reliable.

Controller 234 (which can be combined into controller 12, or act as a separate controller) is operatively connected to the position sensors 228, 230, and 232, and to the upper and lower coils 216, 218 in order to control actuation and landing of the valve 212.

The first position sensor 228 is located around the middle position between the coils 216, 218, the second sensor 230 is located close to the lower coil 218, and the third sensor 232 is located close to the upper coil 216.

As described above, engine 10, in one example, has an electromechanical valve actuation (EVA) with the potential to maximize torque over a broad range of engine speeds and substantially improve fuel efficiency. The increased fuel efficiency benefits are achieved by eliminating the throttle, and its associated pumping losses, (or operating with the throttle substantially open) and by controlling the engine operating mode and/or displacement, through the direct control of the valve timing, duration, and or lift, on an event-by-event basis.

In one example, controller 234 includes any of the example power converters described below.

While the above method can be used to control valve position, an alternative approach can be used that includes position sensor feedback for potentially more accurate control of valve position. This can be use to improve overall position control, as well as valve landing, to possibly reduce noise and vibration.

FIG. 5 shows an alternative embodiment dual coil oscillating mass actuator with an engine valve actuated by a pair of opposing electromagnets (solenoids), which are designed to overcome the force of a pair of opposing valve springs 242 and 244 located differently than the actuator of FIGS. 4A and 4B (other components are similar to those in FIGS. 4A and 4B, except that FIG. 5 shows port 510, which can be an intake or exhaust port). Applying a variable voltage to the electromagnet's coil induces current to flow, which controls the force produced by each electromagnet. Due to the design illustrated, each electromagnet that makes up an actuator can only produce force in one direction, independent of the polarity of the current in its coil. High performance control and efficient generation of the required variable voltage can therefore be achieved by using a switch-mode power electronic converter.

As illustrated above, the electromechanically actuated valves in the engine remain in the half open position when the actuators are de-energized. Therefore, prior to engine combustion operation, each valve goes through an initialization cycle. During the initialization period, the actuators are pulsed with current, in a prescribed manner, in order to establish the valves in the fully closed or fully open position. Following this initialization, the valves are sequentially actuated according to the desired valve timing (and firing order) by the pair of electromagnets, one for pulling the valve open (lower) and the other for pulling the valve closed (upper).

The magnetic properties of each electromagnet are such that only a single electromagnet (upper or lower) need be energized at any time. Since the upper electromagnets hold the valves closed for the majority of each engine cycle, they are operated for a much higher percentage of time than that of the lower electromagnets.

As noted above, one power converter topology that could be used to generate the voltage for this application is a half bridge converter. However, a drawback of the half bridge drive is that four power devices (2 switches and 2 diodes) are required for each electromagnet. With a typical 32 valve V-8 engine requiring 256 devices, an alternative topology that could offer a reduction in device count will provide a large improvement in cost, complexity and package space requirement.

While FIGS. 4a, 4b, and 5 appear show the valves to be permanently attached to the actuators, in practice there can be a gap to accommodate lash and valve thermal expansion.

Figure 6:
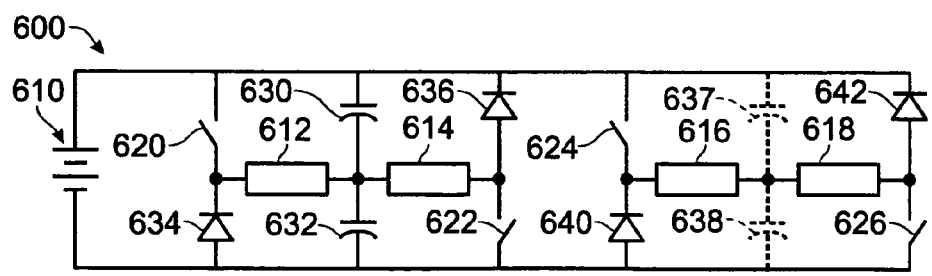
FIG. 6 shows an example embodiment including a dual coil half-bridge converter.

Referring now to FIG. 6, a diagram shows one embodiment of a dual coil half-bridge converter design, which requires half the number of power devices and gate drive circuits when compared with the half-bridge converter, while providing the ability for accurate valve control. This configuration can therefore result in a significant cost savings for the valve control unit (VCU) of the EVA system. In addition, this example converter also cuts the number of power wires between the VCU and the actuators in half, compared with a half-bridge converter, which can significantly reduce the wire harness/connectors cost and weight.

Note that while the examples herein use a dual coil actuator, the converter topology is not limited to dual coil actuators. Rather, it can be used with any system that utilizes multiple actuator coils. Thus, it should be noted that adjacent pairs of converter switches are not necessarily confined to be paired with a single actuators' coils (i.e. each coil of a given actuator may be driven by switches from different legs of the converter).

In the above example, a split-power supply, which provides a return path for the actuator coil currents, is used. In one example, the split supply could be realized using a pair of batteries. However, this may unnecessarily add cost and weight to the vehicle. Therefore, in another example, a split capacitor bank can be used to transform a single battery into a dual voltage source, as shown in FIG. 6.

Note that a capacitor is an example of an energy storage device, and various types of devices can be used to act as a capacitor or energy storage device. Note also that a diode is an example of a unidirectional current device that allows current only to flow in substantially one direction. Various other devices could also be used to provide a diode type function.

In the example dual coil half-bridge design, each actuator coil is connected to the split voltage supply through what can be thought of as a DC/DC converter. Those connected using a high-side switch form a buck DC/DC converter from the supply voltage to the split voltage (mid-point voltage), and those connected using a low-side switch form a boost DC/DC converter from the split voltage to the supply voltage.

The coils are actuated via their respective switches, and the capacitors alternate charge and discharge during the operation of the coils.

Referring now specifically to FIG. 6, an example converter circuit 600 is shown, with power supply (such as, for example, the vehicle battery) 610 and four actuator coils (612, 614, 616, and 618). However, any type of power source could be used. Also, in an alternative embodiment, the single voltage source could be replaced with a dual voltage source (i.e. two voltage sources, each placed in parallel across each of the two split capacitors).

In one embodiment, actuators 612 and 614 represent the two coils of an intake valve in a cylinder of the engine, and actuators 616 and 618 represent an exhaust valve of the same cylinder of the engine. In another embodiment, actuators 612 and 614 represent the two coils of an intake valve in a cylinder of the engine, and actuators 616 and 618 represent an intake valve in another (different) cylinder of the engine. Further, in another embodiment, actuators 612 and 614 represent the two coils of an exhaust valve in a cylinder of the engine, and actuators 616 and 618 represent an exhaust valve in another (different) cylinder of the engine. As indicated and discussed below, certain configuration can provide a synergistic result in terms of maintaining a balance of charge in the capacitors.

Continuing with FIG. 6, four switches are shown (620, 622, 624, and 626), with each switch providing current to an actuator (e.g., 620 energizes/de-energizes 612; 622 energizes/de-energizes 614; 624 energizes/de-energizes 616; 626 energizes/de-energizes 618). Two capacitors are shown (630 and 632 are shown, along with two diodes (634 and 636) for actuators 612 and 614). The diodes provide for flyback current (or freewheel current) when deactivating a valve due to the high inductance of the actuator coils. Further, two diodes 640 and 642 are shown for actuators 616 and 618.

Optionally, two additional capacitors 637 and 638 can be used, where the values of 630 and 637 are the same, as well as the values of 632 and 638, for example. In one example, capacitors 630 and 632 have substantially equal capacitance, however different capacitances can also be used, if desired. This is an example of a split capacitor voltage source (SCVS). In one example, capacitors 630 and 637 are the same physical capacitor and capacitors 632 and 638 are the same physical capacitor.

An alternative arrangement would have the four actuator coils be the upper and lower coils for two intake or two exhaust actuators on the same cylinder. In this case, coils 612 and 614 would be the two upper coils of the two actuators and 616 and 618 would be the two lower coils (or vice versa). Such an example is described in more detail below with regard to Tables 1 and 2.

Example operation of the converter of FIG. 6 is now described for different switch actuation situations. This description relates to actuation of coils 612 and 614 only, however can be easily extended to each coil in the converter. Initially, assuming all switches are open, and assuming a 12 volt power source 610, each capacitor 630 and 632 has 6 volts across it, and diode 636 is blocking current flow. When an increase in current flowing in coil 612 is desired, switch 620 is closed. At this time, a positive voltage is applied across coil 612 from the 12 volt potential (top circuit line) through switch 620 causing the current level in coil 612 to increase. After some time, the charge on capacitor 630 has reduced and the charge on capacitor 632 has increased, resulting in-an increased voltage across capacitor 632 (since the pair of capacitors are sized such that they have enough capacity to withstand normal excursions in actuator current with only small changes in their terminal voltage). Then, when a decrease in the current level in coil 612 is desired, switch 620 is opened. The current flowing through coil 612 forces diode 634 to conduct (turn-on), which applies a negative voltage across coil 612, causing the current level in coil 612 to decrease. When another increase in current is desired, the process is repeated.

Operation of the coil 614 proceeds concurrently with the operation described above for coil 612 and is as follows. When a decrease in the current flowing in coil 614 is desired, switch 622 is closed (positive current flow defined as flowing from the point connecting coil 614 to switch 622 into the point connecting coil 614 to capacitors 630 and 632). At this times, a negative voltage is applied across coil 614 through switch 622 causing the current level in coil 614 to decrease. After some time, the charge on capacitor 630 has increased, and the charge on capacitor 632 has decreased, resulting in an decreased voltage across capacitor 632 (since the pair of capacitors are sized such that they have enough capacity to withstand normal excursions in actuator current with only small changes in their terminal voltage). Then, when a increase in the current level in coil 614 is desired, switch 622 is opened. The current flowing through coil 614 forces diode 636 to conduct (turn-on), which applies a positive voltage across coil 614, causing the current level in coil 614 to increase. When another decrease in current is desired, the process is repeated.

The operation of the circuit for coils 616 and 618 and for any additional coils in the system follows a similar procedure to that described above for coils 612 and 614. It should also be noted that the above described operations, alternatively increase and decrease the 6 volt balance across the capacitors 630 and 632, on average this alternating action will act to balance the voltages on the two capacitors.

Figure 2:
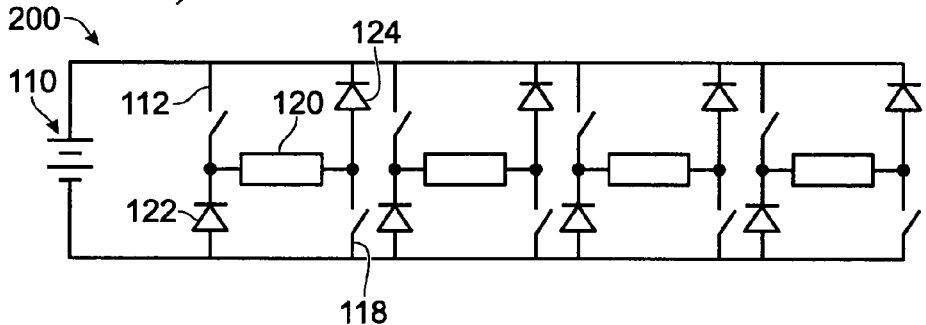
FIG. 2 shows a half-bridge electronic converter.
Figure 7:
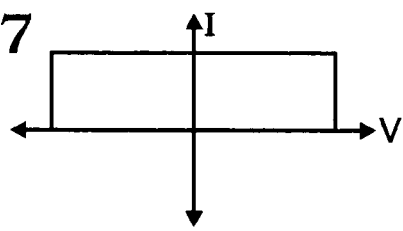
FIG. 7 shows the operating range of the Dual Coil Half-bridge Converter of FIG. 6.

The example converter of FIG. 6 can provide a current versus voltage operating range as shown in FIG. 7, thus allowing substantially the same functionality as a half bridge converter (e.g., as in FIG. 2), while reducing cost and complexity.

Note that while only four actuator coils are shown in FIG. 6, additional stages can be created and cascaded so that all of the valve actuators are included, each with a single actuating switch.

However, the split-capacitor voltage source arrangement may result in different charges being stored in the capacitors, due to the unequal current applied to different coils (e.g., opening versus closing, intake versus exhaust, or combinations thereof, for example). In other words, the balance of charge can be affected by the configuration of these coils in the dual coil half-bridge converter, and therefore the configuration can cause various types of results. Thus, in one example, system configuration is selected to maintain the balance of the charge on each capacitor. However, this system has to contend with the high number of coils in the engine, and the wide range of current that each is conducting.

One method of connecting the coils that assists in advantageously maintaining the required balance is to connect an equal number of similar loads (i.e. upper/lower coils, exhaust/intake valves) in either the buck DC/DC converter configuration or the boost DC/DC converter configuration. When the total load through the buck converter connected coils matches that through the boost converter connected coils, a natural balance of the split voltage supply can occur. An example arrangement of the coils following this concept is shown in Table 1 for a V8 engine with 2 valves per cylinder.

Table 1 shows that the charge balance is maintained when configuring the coils as described above (e.g., with 8 stages, and each stage having 4 coils as shown in FIG. 6 for a V-8 engine with 2 electric valves per cylinder). Capacitor C1 is the upper capacitor (e.g., 630) and C2 is the lower capacitor (e.g., 632), which form the split capacitor voltage source. In the table, the actuator coils are denoted by two levels of shading (shading and no shading), which represent how they are connected to the split voltage supply (through a high-side (shaded) switch (e.g., 620) or a low-side switch (e.g., 622)).

For illustration purposes, the intake actuators are assumed to require 1.0 unit of charge, while the exhaust require 1.5 units of charge, since the exhaust do more work opening against cylinder pressure. For instance in cylinder #1, the lower intake coil is operated 0.25 of the cycle and the upper coil 0.75, totaling 1.0 unit for the entire cycle. For the exhaust valve, the lower coil is assigned 0.375 and the upper coil 1.125, with the total exhaust charge being 1.5 units.

TABLE 1

Actuator Coil Charge Balancing Example (8 cylinder/2 valve per cylinder).

| Cylinder | Intake | | Exhaust | | C1 Charge/ cylinder | C2 Charge/ cylinder |
| --- | --- | --- | --- | --- | --- | --- |
| | Upper | Lower | Upper | Lower | | |
| 1 | 0.75 | 0.25 | 1.125 | 0.375 | 1.375 | 1.125 |
| 2 | 0.75 | 0.25 | 1.125 | 0.375 | 1.125 | 1.375 |
| 3 | 0.75 | 0.25 | 1.125 | 0.375 | 1.375 | 1.125 |
| 4 | 0.75 | 0.25 | 1.125 | 0.375 | 1.125 | 1.375 |
| 5 | 0.75 | 0.25 | 1.125 | 0.375 | 1.375 | 1.125 |
| 6 | 0.75 | 0.25 | 1.125 | 0.375 | 1.125 | 1.375 |

TABLE 1-continued

Actuator Coil Charge Balancing Example (8 cylinder/2 valve per cylinder).

| Cylinder | Intake Upper | Intake Lower | Exhaust Upper | Exhaust Lower | C1 Charge/ cylinder | C2 Charge/ cylinder |
|---|---|---|---|---|---|---|
| 7 | 0.75 | 0.25 | 1.125 | 0.375 | 1.375 | 1.125 |
| 8 | 0.75 | 0.25 | 1.125 | 0.375 | 1.125 | 1.375 |
| TOTALS | | | | | 10 | 10 |

As can be seen by this example, charge balance is achieved for the full engine, as well as for pairs of cylinders. Specifically, being able to maintain charge balance for less than a full engine allows balance charge operation for variable displacement engine (VDE) mode. Thus, in one example, under selected engine operating conditions (e.g., low load, or low torque requirement), the engine operates some cylinders (e.g., half) without fuel injection, thereby deactivating those cylinders (and potentially the valves for those cylinders), during a cycle of the cylinder or the engine. This allows for improved fuel economy by lowering pumping work, yet maintaining an exhaust air-fuel ratio about stoichiometry, for example. In another example, a 4 valve, V-8 engine can be used. This configuration provides even more opportunities for configuring the connection of the actuator coils. An example approach is shown in Table 2 following the methodology described above. As can be seen in the table, charge balance is not only achieved for the full engine but also on a single cylinder basis.

TABLE 2

Actuator Coil Charge Balancing Example (8 cylinder/4 valve per cylinder)

| Cylinder | Intake Upper | Intake Lower | Exhaust Upper | Exhaust Lower | C1 Charge/ cylinder | C2 Charge/ cylinder |
|---|---|---|---|---|---|---|
| 1 | 0.75 | 0.25 | 1.125 | 0.375 | 2.5 | 2.5 |
|   | 0.75 | 0.25 | 1.125 | 0.375 |     |     |
| 2 | 0.75 | 0.25 | 1.125 | 0.375 | 2.5 | 2.5 |
|   | 0.75 | 0.25 | 1.125 | 0.375 |     |     |
| 3 | 0.75 | 0.25 | 1.125 | 0.375 | 2.5 | 2.5 |
|   | 0.75 | 0.25 | 1.125 | 0.375 |     |     |
| 4 | 0.75 | 0.25 | 1.125 | 0.375 | 2.5 | 2.5 |
|   | 0.75 | 0.25 | 1.125 | 0.375 |     |     |
| 5 | 0.75 | 0.25 | 1.125 | 0.375 | 2.5 | 2.5 |
|   | 0.75 | 0.25 | 1.125 | 0.375 |     |     |
| 6 | 0.75 | 0.25 | 1.125 | 0.375 | 2.5 | 2.5 |
|   | 0.75 | 0.25 | 1.125 | 0.375 |     |     |
| 7 | 0.75 | 0.25 | 1.125 | 0.375 | 2.5 | 2.5 |
|   | 0.75 | 0.25 | 1.125 | 0.375 |     |     |
| 8 | 0.75 | 0.25 | 1.125 | 0.375 | 2.5 | 2.5 |
|   | 0.75 | 0.25 | 1.125 | 0.375 |     |     |
| TOTALS | | | | | 20 | 20 |

Under some operating conditions, all valves are actuated each engine cycle in a four-valve per cylinder engine. However, under some operating conditions of a four-valve per cylinder engine (such as lower airflow conditions, for example) one intake valve, or one exhaust valve, or combinations or subcombinations thereof, may be deactivated. Further, in another example, two intake valves and two exhaust valves can be actuated on alternating engine cycles. Even in the further example case of a three-valve engine, the intake valves may be alternated (every cycle, or partially deactivated during selected modes), to improve engine operation at light throttle, and save energy.

However, the inventors herein have recognizes that these various alternative modes of operation can affect the balance of charge. Thus, by proper selection of which valves to actuate and which to hold closed on each cylinder, it may be possible to obtain improved charge balance in the converter. Further, proper selection for each cycle can also aid in maintaining the balance of the split voltage supply. Likewise, during VDE operation, the charge balance can be maintained by choosing to disable the cylinders in natural charge sharing pairs. Also, by appropriately selecting the connection of the coils in the converter, improved charge balance can be achieved. Thus, in addition to selecting which valve to operate, coil connection in the converter can be used to improve balancing. For example, obtaining charge balance through selection of which valve to operate limits the operating modes available, whereas connecting the coils in a preferred fashion increases the operating modes available.

The concept described above for configuring the actuator coils to the split voltage supply can also be applied to other engine configures (I4, V6, etc.) and to differing number of intake and exhaust valves. In addition, the two examples shown above are just one of many configurations for a V-8 engine (e.g., swapping the coils connected to the high-side and low-side switches is just one of many potential other arrangements).

Referring again to FIG. 6, additional details of circuit operation are described. Specifically, the circuit shows a four coil configuration. In a V8 engine application, for example, there would typically be thirty-two valves (and actuators) or sixty-four individual coils. The dual coil half-bridge topology, shown in this figure, provides for each group of four devices (a half bridge equivalent) to drive a pair of coils rather than just a single coil. With the exception of a freewheeling mode, this circuit has the exact same circuit functionally as does a prior art half-bridge converter. However, in this configuration, each actuator coil is driven by a voltage that is half of the battery voltage. Again, it should be noted that even though only four coils are shown in the figure, the series could be extended indefinitely.

In FIG. 6, a single phase consists of a switch (620), a diode (634), an actuator coil (612) and the SCVS (capacitors 630 and 632). The operation of each phase, whether high-side or low-side switched, is similar. Specifically, a desired voltage for a given coil is commanded and the power switch for that coil is modulated to produce the desired voltage. The adjacent diode is required to conduct the current in the coil during periods when the switch is turned off. Each coil can be independently voltage controlled without any constraints from the other coils. The SCVS consisting of capacitors 630 and 632 are common to all coil pairs, that is, only the two capacitors are required for the entire converter.

Figure 8:
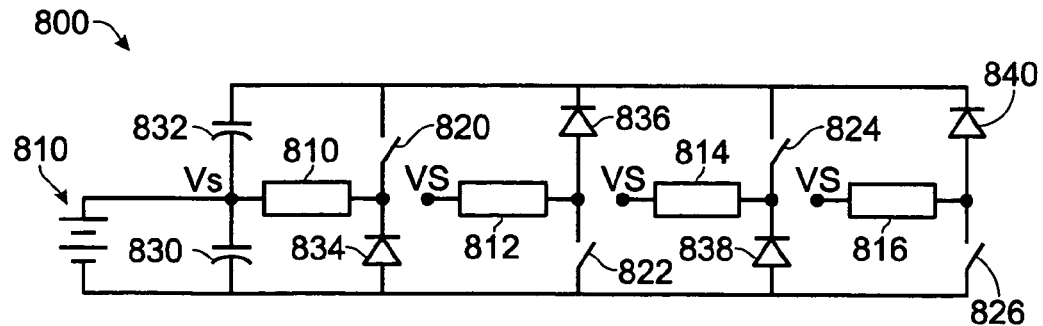
FIG. 8 dual coil half bridge (boosted-supply) converter.

An alternative embodiment can be accomplished by changing the wiring connections between the battery and the capacitors, as shown in FIG. 8. This alternate circuit configuration has substantially the same circuit function as the circuit in FIG. 6. However, one difference in the boosted circuit design of FIG. 8 is the battery is now connected across only one half of the split voltage supply. The configuration of the coils to aid in maintaining a charge balance using this configuration of the converter follows the same procedure as described for the design shown in FIG. 6. Again, each configuration for the dual coil half-bridge converter provides substantially identical function, however, the voltage and current rating of the converter components would be different due to the difference in currents and voltages.

Referring now specifically to FIG. 8, converter 800 is shown with four coils 810, 812, 814, and 816. Further, the Figure identifies 4 nodes tied to the output of power supply 810 as Vs (indicating source voltage). One end of each actuator is coupled to a Vs node. Further, each coil has a corresponding switch, with switch 820 energizing/de-energizing coil 810; switch 822 energizing/de-energizing coil 812; switch 824 energizing/de-energizing coil 814; and switch 826 energizing/de-energizing coil 816. Further, a diode is used to allow freewheeling current during de-energizing. Specifically, diode 834 is coupled to one end of coil 810, diode 836 is coupled to one end of coil 812, diode 838 is coupled to one end of coil 814, and diode 840 is coupled to one end of coil 816. In addition, capacitors 830 and 832 are coupled in the converter, with capacitor 830 coupled in parallel with power supply 810.

Figure 9:
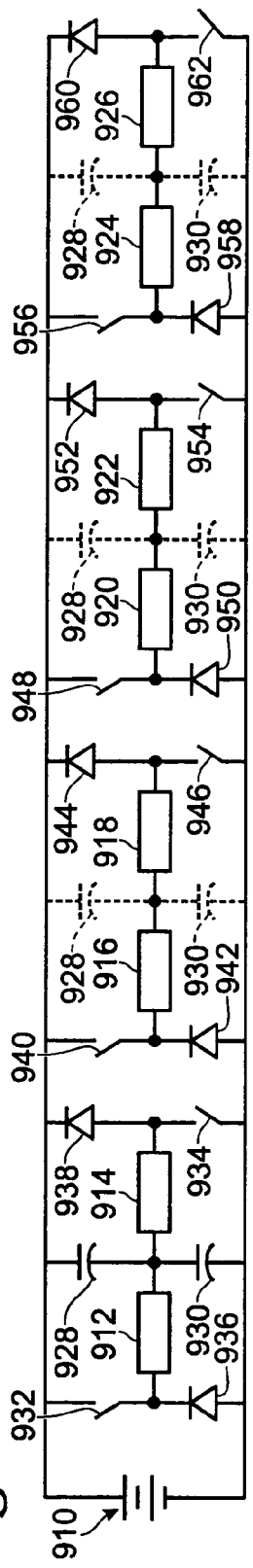
FIG. 9 shows a dual coil half bridge converter (split supply version)

Referring now to FIG. 9, a dual coil half-bridge converter topology is shown for an engine with intake only electric valves and a cam-actuated exhaust valve (e.g., fixed cam timing or a variable cam timing). Note that FIG. 6 is a subset of FIG. 9.

The split-capacitor voltage source (SCVS) arrangement is shown in FIG. 9 illustrates an example driver arrangement for eight actuator coils (4 valves). As above, the arrangement can be extended to provide for 8 valve operation, 16 valve operation, etc. For the boosted supply version, the expansion would be very much the same. For simplicity of the illustration, multiple pairs of capacitors are shown with dotted lines, and are optionally included. It should be understood that in the examples illustrates, there is only a single pair of capacitors (928 and 930). To realize this circuit in hardware, wire connections are used to provide connectivity to one end of each actuator coils and to the capacitors.

Specifically, FIG. 9 show power source 910 coupled to 8 actuator coils (912, 914, 916, 918, 920, 922, 924 and 926). Coils 912 and 914 are actuated by switches 932 and 934, and have freewheeling diodes 936 and 938. Likewise, each of the other pair of coils have respective switches (940, 946, 948, 954, 956, and 962) and diodes (942, 944, 950, 952, 958, and 960). Further, FIG. 9 shows how the coils are cascaded together with 4 stages of 2 coils each.

As described above, one method of connecting the coils that assists in maintaining the required balance is to connect an equal number of similar loads (i.e. upper/lower coils valves) in either the buck DC/DC converter configuration or the boost DC/DC converter configuration. When the total load through the buck converter connected coils matches that through the boost converter connected coils, a natural balance of the split voltage supply can occur. An example arrangement of the coils following this concept is shown in Table 3 for a V8 engine with one valve and Table 4 for a V8 engine with two intake valves per cylinder.

Each table below shows that the charge balance is maintained when configuring the coils as described above. Capacitor C1 is the upper capacitor and C2 is the lower capacitor, which form the split capacitor voltage source. In the table the actuator coils are denoted by two colors (shaded or unshaded), which represent how they are connected to the split voltage supply (through a high-side or a low-side switch). For illustration purposes, the intake actuators are assumed to require 1.0 unit of charge. For instance in cylinder #1, the lower intake coil is operated 0.25 of the cycle and the upper coil 0.75, totaling 1.0 units for the entire cycle. As can be seen by this example, charge balance is achieved for the full engine, as well as for pairs of cylinders. As noted above, the ability to maintain charge balance for less than all cylinders operating enables improved variable displacement engine (VDE) operation.

TABLE 3

Actuator Coil Charge Balancing Example (8 cylinder/2 valve per cylinder)

| Cylinder | Intake only | | C1 | C2 |
| --- | --- | --- | --- | --- |
| | Upper | Lower | Charge/cylinder | Charge/cylinder |
| 1 | 0.75 | 0.25 | 0.75 | 0.25 |
| 2 | 0.75 | 0.25 | 0.25 | 0.75 |
| 3 | 0.75 | 0.25 | 0.75 | 0.25 |
| 4 | 0.75 | 0.25 | 0.25 | 0.75 |
| 5 | 0.75 | 0.25 | 0.75 | 0.25 |
| 6 | 0.75 | 0.25 | 0.25 | 0.75 |
| 7 | 0.75 | 0.25 | 0.75 | 0.25 |
| 8 | 0.75 | 0.25 | 0.25 | 0.75 |
| TOTALS | | | 4 | 4 |

TABLE 4

Actuator Coil Charge Balancing Example (8 cylinder/4 valve per cylinder)

| Cylinder | Intake only | | C1 | C2 |
| --- | --- | --- | --- | --- |
| | Upper | Lower | Charge/cylinder | Charge/cylinder |
| 1 | 0.75 | 0.25 | 1 | 1 |
| 2 | 0.75 | 0.25 | 1 | 1 |
| | 0.75 | 0.25 | | |
| 3 | 0.75 | 0.25 | 1 | 1 |
| | 0.75 | 0.25 | | |
| 4 | 0.75 | 0.25 | 1 | 1 |
| | 0.75 | 0.25 | | |
| 5 | 0.75 | 0.25 | 1 | 1 |
| | 0.75 | 0.25 | | |
| 6 | 0.75 | 0.25 | 1 | 1 |
| | 0.75 | 0.25 | | |
| 7 | 0.75 | 0.25 | 1 | 1 |
| | 0.75 | 0.25 | | |
| 8 | 0.75 | 0.25 | 1 | 1 |
| | 0.75 | 0.25 | | |
| | 0.75 | 0.25 | | |
| TOTALS | | | 8 | 8 |

As described above, various examples of power electronic converter topologies are descried for an EVA system. Further, by selective configuration of the coils to this converter, improved functionality can be achieved when compared with conventional approaches. For example, a 50% reduction in the number of power devices and gate drivers, resulting in lower cost, better reliability and improved packaging of the VCU, can be achieved. This configuration also allows additional cost saving in the EVA wire harness by reducing the number of power wires between the VCU and actuator by 50%. The reduced part count, cost, package size, weight, and number of wires required can simplify the implementation and migration of EVA technology into production.

Active Voltage Balance Control

As discussed above, FIG. 6 shows a version (split supply) of the dual coil half-bridge converter that can be used for controlling valve actuators in an EVA system. The split capacitor bank is used to transform a single battery into a dual voltage source, where the system voltage level would be chosen based on the actuator performance considerations. Further, as noted above, each actuator coil is connected to the split voltage supply through what can be thought of as a DC/DC converter—those connected using a high-side switch (612 and 616) form a buck DC/DC converter from the supply voltage to the split voltage (mid-point voltage) and those connected using a low-side switch (614 and 618) form a boost DC/DC converter from the split voltage to the supply voltage.

While connecting an equal number of similar loads (i.e. upper/lower coils, exhaust/intake valves) in either the buck or the boost converter configuration assists in maintaining the required capacitor charge balance, actuator loads may not be exactly equal. In other word, when the total load through the buck converter connected coils matches that through the boost converter connected coils, a natural balance of the split voltage supply will occur. However, since the actuator loads may not be exactly equal, an additional method of maintaining the charge balance (and providing the desired voltage on each of the capacitors), may be needed. Therefore, in one embodiment, a midpoint voltage regulator (MVR) can be used as discussed in more detail below.

Note that the desired voltage across each of the capacitors can be determined by the ratio of the individual stored charge and the capacitance value (V=q/C). This ratio may be chosen to be unity, i.e. equal voltage across each capacitor, or some other value depending on the requirements of the system.

Figure 10:
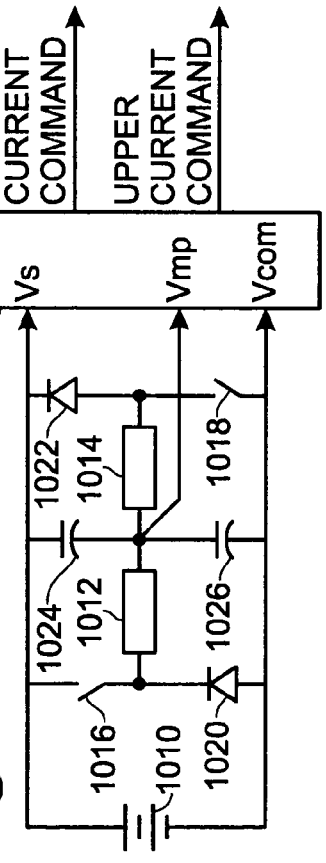
FIG. 10 shows a midpoint voltage regulator circuit (split supply)

Referring now to FIG. 10, an example midpoint voltage regulator (MVR) is shown. In this case, a power supply 1010 is shown coupled to a dual coil half bridge, which in this example uses only two actuators (1012 and 1014) actuated by switches 1016 and 1018, respectively. As above, diodes 1020 and 1022 are also present. In this embodiment, the MVR (1030) maintains a desired ratio voltage across each of the capacitors (e.g., 1024 and 1026 in FIG. 10). This is accomplished by monitoring the supply and midpoint voltages, and then performing a regulation function that keeps the midpoint (MP) voltage at a desired level (which can vary with engine and or cylinder operating conditions).

In one example, the regulation can be accomplished by exploiting the inherent buck and boost converter actions, described above. Specifically, by commanding additional buck action when the MP voltage gets too low (and/or additional boost action when the MP voltage gets too high) a mechanism for providing the regulation function can be implemented.

One method that can be used to implement a midpoint voltage regulator is to add an additional buck/boost DC/DC converter in parallel with the dual coil half-bridge converter, whose purpose is to provide a regulation function, although it can be used for other functionality, if desired. While this approach can achieve the desired result, it may unnecessarily waste energy in its operation. Therefore, in an effort to improve overall operation, an alternative embodiment uses another form of a midpoint voltage regulator. Specifically, this alternative midpoint voltage regulator uses the actuator coils (the dual coil half-bridge converter) to implement the desired regulation. This is achieved, as described below, without compromising the primary current control function of the converter.

Note that in many applications, midpoint voltage regulation using the actuator coils would not be possible because each of the loads (actuators) on the converter would be required to follow a current command that can not be varied for any ancillary purposes. However, in the application for engine cylinder valve actuation, actuator current regulation is required to follow a specific command under some conditions (such as specific transient periods of operation). But, under other conditions, actuator current can vary within a larger range from the desired value. Recognition of this allows synergistically exploitation of the circuit structure to enable midpoint voltage regulation without unnecessarily wasting energy. In other words, this provides the opportunity to interleave midpoint voltage regulation within the normal actuator current control function.

Figure 11:
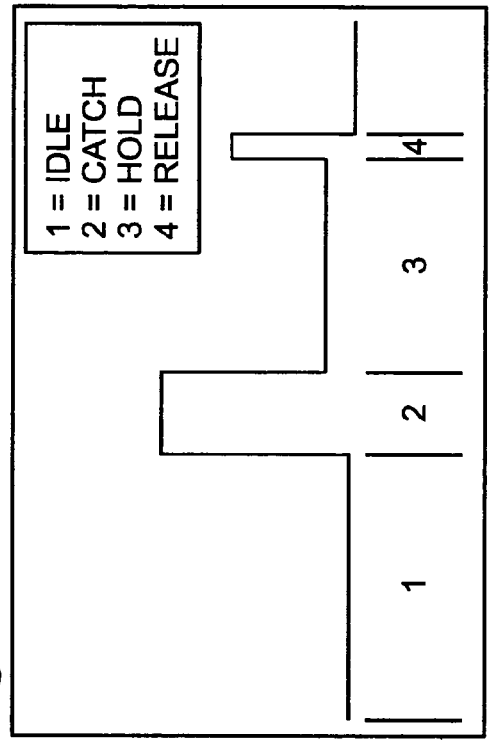
FIG. 11 shows an example EVA actuator current profile.

The waveform shown in FIG. 11 shows an example EVA actuator current profile. It is broken into four distinct periods (valve modes) of operation: idle (1), catch (2), hold (3), and release (4).

Higher precision current control is used during modes 2 and 4, as these are the periods when the valve is transitioning. However, during the idle mode, current can be adjusted to a greater degree because during an idle period a particular coil is not needed for control of the actuator armature. Further, during this duration, the air gap between the coil and actuator is sufficiently large that the force produced by any current in that coil has a small effect (i.e., the valve position is substantially unaffected by the variation in current, such as, for example, less than 5% of total travel movement). During the hold mode, the actuator is firmly held in either the fully open or fully closed position and although the current must not be reduced too much, it can be increased without significant effect on valve position.

These two periods constitute the majority of the total actuator cycle and provide a significant opportunity for allowing voltage regulation. In other words, the ability to adjust current during modes 1 and 3 is more than adequate for achieving the desired midpoint voltage regulation, in some examples. The large number of individual actuators and coils in a typical EVA system also provides advantages for the midpoint voltage regulator being disclosed since the multiple coils that are in either the hold or idle phase are used in parallel with each other for the midpoint voltage regulation, resulting in a reduced load per coil. Furthermore, it can result in an effective bandwidth for the voltage regulation that is higher than that of a single coil alone, or that of using a specialized voltage regulator that is added to the circuit.

Figure 12:
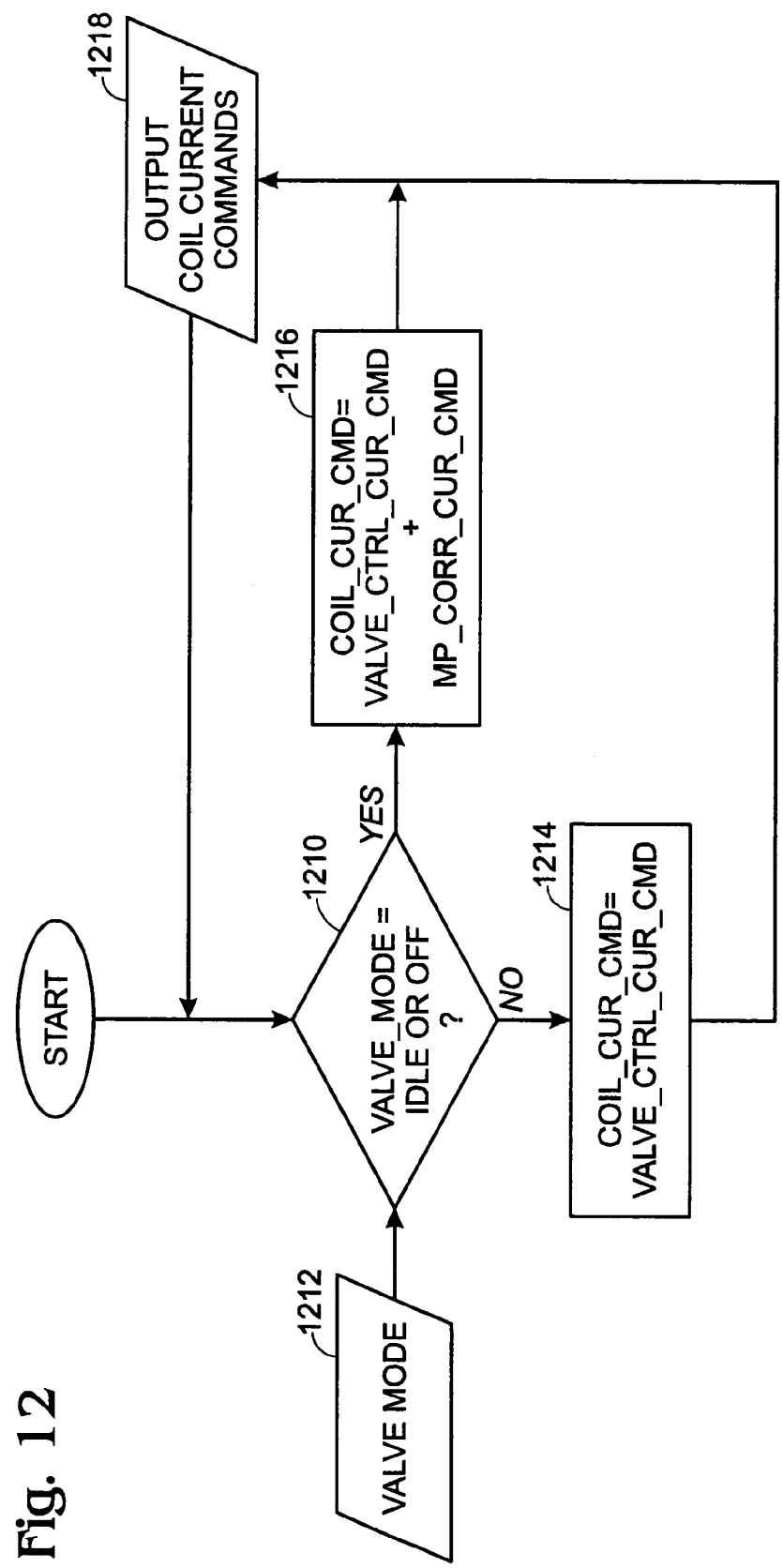
FIG. 12 shows a coil current control command generator flow chart.

The flowchart shown in FIG. 12 depicts the process of adding the MPV correction command to a single actuator coil current control command. In this flowchart the valve controller current command (VALVE_CTRL_CUR_CMD) is the target current command generated by the valve position controller. The midpoint correction current command (MP_CORR_CUR_CMD) is the additional command used for midpoint regulation. Since the midpoint voltage regulator generates different commands depending on whether midpoint voltage correction is desired using either high-side driven or low-side driven actuator coils, the above flowchart-would be duplicated for each of the two types of actuator coils (high-side driven and low-side driven), with MP_CORR_CUR_CMD shown in the flowchart corresponding to the appropriate correction command (U_CMD or L_CMD) from the midpoint voltage regulator. In addition to the method shown in FIG. 12, the correction commands may be further restricted to be applied to only coils that are in the idle mode or only coils that are in the off mode, if so desired.

The control routines included herein can be used with various engine configurations, such as those described above. As will be appreciated by one of ordinary skill in the art, the specific routine described below in the flowchart(s) may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, the flowchart(s) graphically represents code to be programmed into the computer readable storage medium in controller 12.

Referring now specifically to FIG. 12, in step 1210, a determination is made as to whether the valve mode is in the idle condition, or the off condition, based on an input 1212 from the valve position controller. As noted above, additional valve conditions could be added, such as whether the valve is in the hold mode, for example. When the answer to step 1212 is NO, the routine continues to step 1214 to set the current coil command (COIL_CUR_CMD) to the valve control current command (VALVE_CTRL_CUR_CMD), so the no adjustment to the current is made to regulate the midpoint voltage. Alternatively, when the answer two step 1210 is YES, the routine continues to step 1216 to add a feedback correction voltage (MP_CORR_CUR_CMD) to the valve control current command (VALVE_CTRL_CUR_CMD) to form the the current coil command (COIL_CUR_CMD) in step 1216. The feedback correction is based on, in one example, a difference between a desired midpoint voltage and measured midpoint voltage, along with a proportional gain. However, in an alternative embodiment, integral control action can be added, if desired. From either step 1214 and 1216, the routine continues to step 1218 to output the coil current commands.

Figure 13:
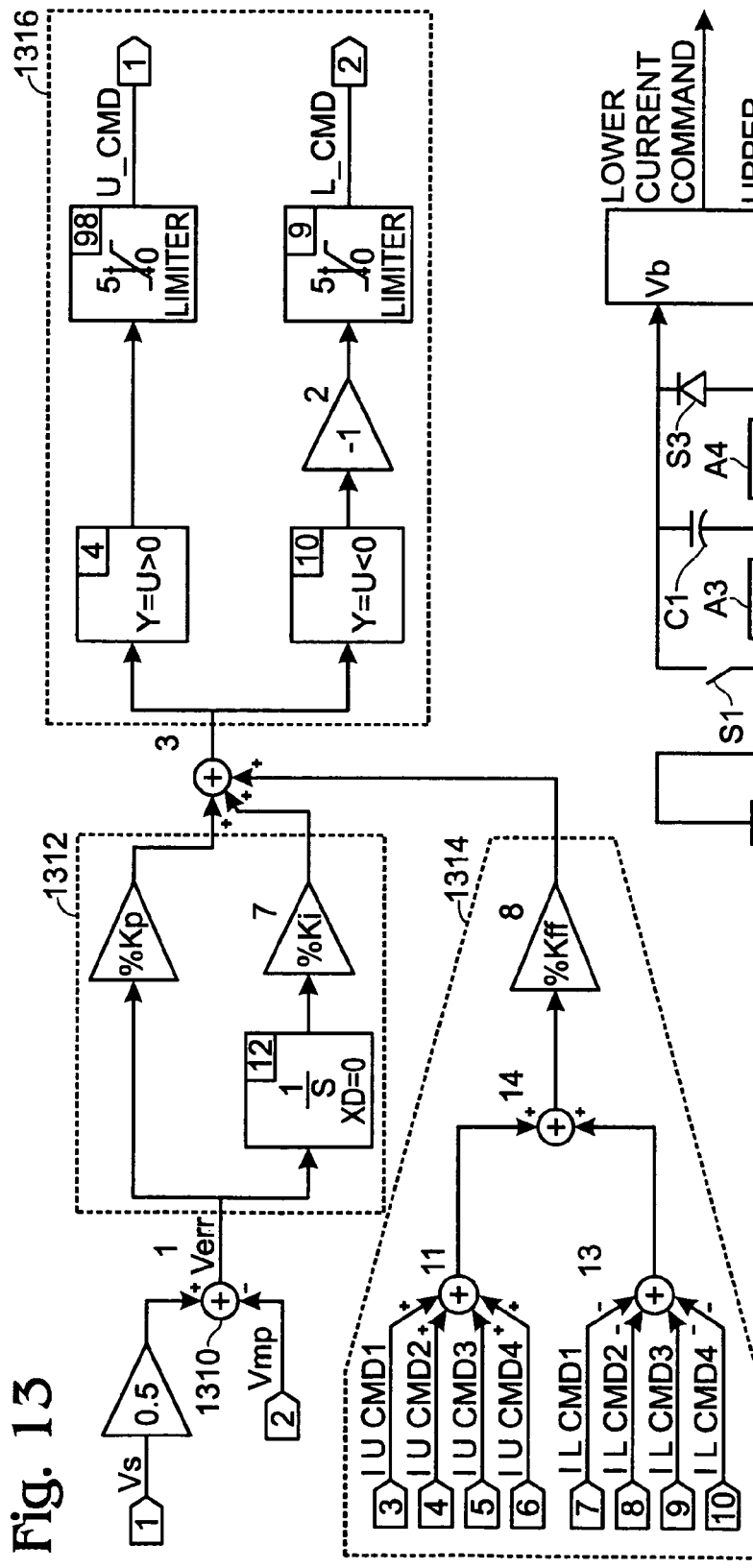
FIG. 13 shows a feedback (P-I) and feedforward (FF) correction current controller (shown for 8 coils)

An example of the control algorithm that can be used to generate the two midpoint voltage correction current commands (U_CMD & L_CMD) is shown in FIG. 13, which shows proportional and integral control action, along with feedforward control action using a prediction of the required action needed to maintain midpoint voltage regulation. Furthermore, limits are shown to prevent integrator windup, as well as to reduce over adjustment to coil currents during engine operation.

The operation of this controller is as follows. The input signals ½ VS (a one half gain is used since the midpoint voltage is being regulated to be equal to one half of the source voltage) and VMP (measured or estimated midpoint voltage) are summed to generate the midpoint voltage error (VERR) at 1310. This error quantity is then acted on by a proportional-Integral (PI) controller at 1312, producing a feedback correction command. This feedback correction command is summed with the feed-forward correction command generated with a feed-forward controller 1314, using feedforward gain (Kff) and a sum of all of the current commands for the actuators (note that this example shows four actuators, although more could be used, if desired). The three gain blocks (KP,KI and KFF) are all user programmable gains to tune and control the algorithm operation, which can vary as operating conditions change, in one example. The sum of the feedback and feed-forward correction commands is then compared to determine its sign at 1316. If this command is positive, a magnitude limited current command (U_CMD) will be generated, while the (L_CMD) command remains at zero. Should the sign of the error be negative, then a magnitude limited current command (L_CMD) will be generated, while the (U_CMD) remains at zero.

The feed-forward controller 1314 shown is based on the unmodified valve control current commands. Each of the current commands for the high-side driven coils are summed with the negative summation of the current commands for the low-side driven coils. The resulting signal is an estimate of the charge imbalance that will be generated on the capacitor banks as a result of these current commands, which can be a good estimate of the instantaneous correction needed by the midpoint voltage regulator. Therefore, in one example, a typical feed forward controller gain (KFF) would be equal to 1/(the total number of coils used to achieve the midpoint regulation). By choosing the gain in this way, the feedforward controller estimates the incremental current that needs to be commanded to each of the coils used to maintain the midpoint regulation.

After proper tuning of the three gain terms this controller can accurately maintain a balanced pair of capacitor voltages.

Figure 14:
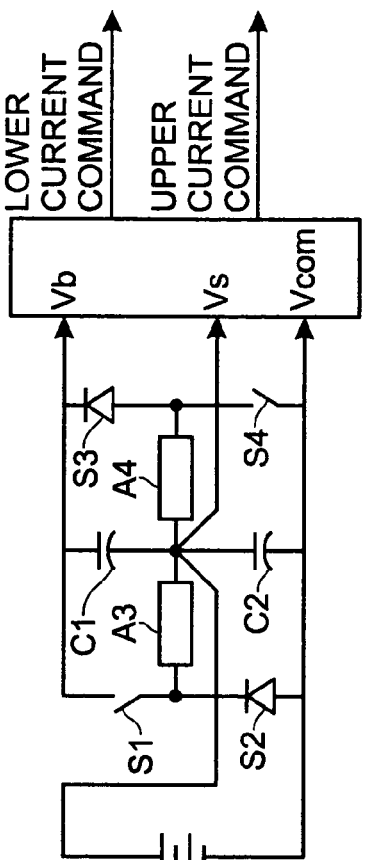
FIG. 14 shows a midpoint voltage regulator circuit (boosted supply).

Another alternative embodiment of the dual coil converter is shown in FIG. 14, termed the boosted supply version. In this version the battery is connected directly across the lower supply, (capacitor C2), fixing its voltage at the battery voltage level. The upper voltage is generated by the coil return current through the upper capacitor, when the upper power switches are conducting. A boost action induces a voltage across the upper capacitor and forms the upper (boosted) supply. The control techniques for this derivative are similar to that of the previously mentioned "split supply" version of the dual coil half bridge converter in FIG. 10. One potential difference is that the voltage levels can be higher and that the upper voltage level is no longer bounded by the battery voltage.

However, based on the circuit design, there is a potential for the boosted voltage to reach a higher than desired amount.

One approach would be to form to equal voltages across each leg of the dual power supply. However, this topology is not limited to equal voltages. Rather, while the lower supply voltage is equal to the battery voltage, the upper voltage may be any level, including: twice the battery voltage or a certain fixed amount above the battery voltage. In this embodiment, the midpoint controller becomes essentially a boost voltage controller. Either form of this converter topology can be implemented with only minor circuit reconfigurations and appropriate changes to the component voltage or current ratings.

It will be appreciated that the configurations and routines disclosed herein are exemplary in nature, and that these specific embodiments are not to be considered in a limiting sense, because numerous variations are possible. For example, the above converter technology can be applied to V-6, I-4, I-6, V-12, opposed 4, and other engine types. Also, approach described above is not specifically limited to a dual coil valve actuator. Rather, it could be applied to other forms of actuators, including ones that have only a single coil per valve actuator.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A system comprising:
    a circuit for selectively actuating an electromagnetic actuator coupled to a cylinder valve of an engine, the circuit having at least two energy storage devices and at least one switch that selectively energizes said actuator; and
    a computer readable storage medium having a computer program encoded therein for regulating energy stored in said energy storage device, said computer storage medium comprising:
        code for regulating voltage at said energy storage device by adjusting said switch during a first set of engine valve operating conditions and for regulating a voltage between said at least two energy storage devices.

2. The system of claim 1 wherein said code for regulating voltage adjusts said switch without substantially moving said valve of said engine.

3. The system of claim 1 wherein said computer readable storage medium further comprises code for adjusting said switch during a second set of engine valve operating conditions to open or close said valve and regulate engine output.

4. The system of claim 1 wherein said energy storage device is a capacitor.

5. A system comprising:
    a circuit for selectively actuating an electromechanical actuator coupled to a valve of an engine, the circuit having a split capacitor voltage source having a first capacitor and a second capacitor, and at least a first switch that selectively energizes a first coil of said actuator and a second switch that selectively energizes a second coil of said actuator; and
    a computer readable storage medium having a computer program encoded therein for regulating voltage at a reference between said first and second capacitors, said computer storage medium comprising:
        code for adjusting at least one of said first and second switches during a first mode to regulate said voltage to a desired value; and
        code for adjusting said at least one of said first and second switches during a second mode to actuate said valve of said engine.

6. The system of claim 5 what said code adjusts current to said first and second capacitors to regulate said voltage.

7. The system of claim 6 wherein said first mode includes conditions where said coils generate different loading on said circuit.

8. The system of claim 5 wherein said first mode includes a valve open position.

9. The system of claim 5 wherein said first mode includes when said valve is in an idle position.

10. The system of claim 5 wherein said first mode includes valve closed position.

11. The system of claim 5 wherein said second mode includes when said valve is opening.

12. The system of claim 5 wherein said second mode includes when said valve is closing.

13. The system of claim 5 wherein said engine operates, during a first set of conditions, with all cylinders carrying out combustion, and during a second set of conditions where at least one cylinder is deactivated.

14. A system comprising:
    a circuit for selectively actuating an electromechanical actuators coupled to cylinder valves of an engine, the circuit having a split capacitor voltage source having a first capacitor and a second capacitor, and at least a first switch that selectively energizes a first coil of a first actuator and a second switch that selectively energizes a second coil of a second actuator; and
    a computer readable storage medium having a computer program encoded therein for regulating voltage at a reference between said first and second capacitors, said computer storage medium comprising:
        code for adjusting at least one of said first and second switches during a first mode to regulate said voltage to a desired value; and
        code for adjusting said at least one of said first and second switches during a second mode to actuate one of said first and second valves of said engine.

15. The system of claim 14 where said code adjusts current to said first and second capacitors to regulate said voltage.

16. The system of claim 15 wherein said first mode includes conditions where said coils generate different loading on said circuit.

17. The system of claim 14 wherein said first mode includes a valve open position.

18. The system of claim 14 wherein said first mode includes a valve closed position.

19. The system of claim 14 wherein said first mode includes a valve idle position.

20. The system of claim 14 wherein said first actuator is coupled to a first valve, and said second switch is coupled to a second valve, wherein said second mode includes when one of said first and second valves of said engine is opening.

21. The system of claim 14 wherein said first actuator is coupled to a first valve, and said second switch is coupled to a second valve, wherein said second mode includes when one of said first and second valves of said engine is closing.

22. The system of claim 14 wherein said engine operates with all cylinders carrying out combustion during a first set of conditions, and with at least one cylinder deactivated during a second set of conditions.

* * * * *